United States Patent
Noguchi (10) Patent No.: US 8,529,640 B1
(45) Date of Patent: Sep. 10, 2013

(54) DYEING COMPOSITE AND METHOD OF DYEING FIBER

(75) Inventor: Masakatsu Noguchi, Kanagawa (JP)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 13/577,729

(22) PCT Filed: Apr. 25, 2012

(86) PCT No.: PCT/JP2012/002845
§ 371 (c)(1),
(2), (4) Date: Aug. 8, 2012

(51) Int. Cl.
*C09B 62/00* (2006.01)

(52) U.S. Cl.
USPC .................................. 8/543; 8/552

(58) Field of Classification Search
USPC ........................................ 8/543, 552
See application file for complete search history.

(56) References Cited

U.S. PATENT DOCUMENTS

| 5,147,744 A | 9/1992 | Sacripante et al. |
| 6,440,340 B1 | 8/2002 | Smith et al. |

FOREIGN PATENT DOCUMENTS

| JP | 01-167849 | | 7/1989 |
| JP | 03-028859 | | 2/1991 |
| JP | 05-061255 | * | 3/1993 |
| JP | 2002348308 A | | 12/2002 |

OTHER PUBLICATIONS

English abstract of of the Japanese Patent No. JP 05-061255 dated 1993.*
International Search Report and Written Opinion for PCT/JP2012/002845 dated Jul. 3, 2012.
Caruso, Nanoengineering of Particle Surfaces, *Advanced Materials* (Jan. 16, 2001), 13(1):11-22 (Abstract).
Liu et al., Preparation and characterization of polymer-coated core-shell structured magnetic microbeads, *Journal of Magnetism and Magnetic Materials* (Mar. 28, 2003), 265(1):98-105 (Abstract).
Lu et al., Magnetic Nanoparticles: Synthesis, Protection, Functionalization, and Application, *Angewandte Chemie International Edition* (Feb. 5, 2007), 46(8):1222-1244 (Abstract).
Maharjan et al., Development of a temperature-responsive agarose-based ion-exchange chromatographic resin, *Journal of Cromatopgraphy A* (Apr. 18, 2009), 1216:8722-8729.
Penner et al., Anion-exchange ability of neutral hydrophobic hypercrosslinked polystyrene, *Anal. Commun.* (1999), 36:199-201.
Zhang et al., Synthesis and characterization of magnetic polymer microspheres with photoconductivity, *Colloid and Polymer Science* (Jul. 2002), 280(7):674-677 (Abstract).
Polymer Particles Business, http://www.atect.co.jp/polymer/polymer.htm [Printed From Internet Jul. 24, 2012].

* cited by examiner

*Primary Examiner* — Eisa Elhilo
(74) *Attorney, Agent, or Firm* — Pepper Hamilton LLP (57) ABSTRACT

A dyeing composite comprising: a polymer core containing a magnetic material; and at least one dye arranged so as to surround the polymer core, as well as a method of preparing the dyeing composite, are described. The dyeing composite is used in a method of dyeing a fiber.

27 Claims, 1 Drawing Sheet

DYEING COMPOSITE AND METHOD OF DYEING FIBER

CLAIM OF PRIORITY

This application is a U.S. national stage filing under 35 U.S.C. §371 of International Application No. PCT/JP2012/002845 filed on Apr. 25, 2012, entitled "Dyeing Composite and Method of Dyeing a Fiber," which is incorporated herein by reference in its entirety.

BACKGROUND

The common processes in fiber-dyeing can be roughly summarized as follows: (1) applying dyes dissolved in water to fibers evenly; (2) applying heat to react fibers and dyes; (3) removing the unreacted dyes by washing the fibers with a large amount of water; and (4) drying the fibers. These processes are repeated as needed.

In the fiber-dyeing processes, one of the important elements is water. A large amount of water is used and a large amount of wastewater is discharged. To prevent environmental pollution, it is desirable to clean the wastewater. However, since the dyes are intrinsically not highly water-soluble and have a high absorption coefficient, most cleaning methods are expensive and energy-consuming, such as adsorption with activated carbon or distillation.

Many dye plants treat their wastewater using a combination of the coagulation-sedimentation method and the activated sludge method. However, these methods can only remove dyes that are relatively easy to remove, and other dyes remain discharged in the wastewater. Also, in these methods, the excess sludge, a by-product of water treatment, then has to be safely disposed.

DETAILED DESCRIPTION

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

The present disclosure describes techniques, devices, apparatuses, systems, and methods for dyeing a fiber including, but not limited to, a dyeing composite for dyeing a fiber, a method of preparing the dyeing composite, a method of dyeing a fiber using the dying composite, a method of washing a dyed fiber, a method of cleaning the wastewater from the dyeing, a method of reusing the dying composite, and a method of minimizing the wastewater from dying.

In one embodiment, the "dyeing composite" for dyeing a fiber may comprise a polymer core containing magnetic material and at least one dye arranged so as to surround the polymer core. In another embodiment, the polymer core is encapsulating the magnetic material.

A wide variety of polymers may be used as the polymer core. In the present disclosure, the polymer of the polymer core may be derived from polymerization of one or more additional monomers selected from, for example, the group consisting of acrylates, methacrylates, styrenes, vinyl chloride and derivatives thereof, polypropylene and derivatives thereof, polyethylene and derivatives thereof, engineering plastics, polyurethanes, polyamides, polyimides, epoxy resins, melamine resins, acetylcellulose, nitrocellulose, phenol resin and rubbers. The polymers may be used alone, or two or more polymers may be used in combination.

Examples of the acrylates may include, but are not limited to, methyl acrylate, ethyl acrylate, propyl acrylate, butyl acrylate, pentyl acrylate, hexyl acrylate, heptyl acrylate, octyl acrylate, cyclohexyl acrylate, lauryl acrylate, stearyl acrylate, benzyl acrylate, ethoxypropyl acrylate, methylbutyl acrylate, ethylhexyl acrylate, methoxybutyl acrylate, cyanobutyl acrylate, and tosyl acrylate. Examples of the methacrylates may include, but are not limited to, methyl methacrylate, ethyl methacrylate, propyl methacrylate, butyl methacrylate, pentyl methacrylate, hexyl methacrylate, heptyl methacrylate, octyl methacrylate, cyclohexyl methacrylate, lauryl methacrylate, stearyl methacrylate, benzyl methacrylate, ethoxypropyl methacrylate, methylbutyl methacrylate, ethylhexyl methacrylate, methoxybutyl methacrylate, cyanobutyl methacrylate, and tosyl methacrylate. A non-limiting example of the styrene may be acrylic styrene. Examples of the engineering plastics may include, but are not limited to, polyphenylene sulfide, polyoxymethylene, polyethersulphone, acrylonitrile butadiene styrene (ABS), Polycarbonates (PC), Polybutylene terephthalate (PBT) and polyethylene terephthalate (PET). Examples of the rubbers may include, but are not limited to, natural rubber, chlorinated rubber, styrene-butadiene rubber and nitrile butadiene rubber.

In one embodiment, the polymer core may be derived from hydrophobic polymers, such as a polymer having a small solubility parameter (SP value). In a further embodiment, the polymer core may be derived from a polymer having an SP value of not greater than 8, such as polyethelene with an SP value of around 7.9. In a still further embodiment, the polymer core may be derived from a polymer having an SP value of not greater than that of the fiber to be dyed with the dyeing composite comprising the polymer core. The polymer core derived from the hydrophobic polymer may bind at least one dye with hydrophobic bonding. In another embodiment, the polymer core may be derived from hydrophilic polymers, such as a polymer having a large SP value. In a further embodiment, the polymer core may be derived from a polymer having an SP value of not greater than 15, such as nylon with an SP value of around 13.6. The polymer core derived from the hydrophilic polymers may be covered by a hydrophobic layer as described below, and the hydrophobic layer may bind at least one dye with hydrophobic bonding.

A wide variety of magnetic materials, which respond to an applied magnetic field, may be contained in the polymer core. The magnetic materials may be selected from materials that can be magnetized by an external magnetic field and remain magnetized after the external field is removed. In one embodiment, the magnetic material may be a ferromagnetic material. In the present disclosure, the magnetic material may be selected from the group consisting of cobalt, iron, cobalt-iron alloys, cobalt alloys where the alloyed metal is selected from nickel, chromium, vanadium, manganese, magnesium, molybdenum, lead, titanium, copper, aluminum, zirconium, chromium, platinum, tungsten, gold, berylium or rare earth metals, and iron alloys where the alloyed metal is selected from nickel, chromium, vanadium, manganese, magnesium, molybdenum, lead, titanium, copper, aluminum, zirconium, chromium, platinum, tungsten, gold, berylium or rare earth metals, an oxide thereof, a ferrite comprising the oxide thereof, and a mixture thereof. The magnetic materials may be used alone, or two or more magnetic materials may be used in combination. In an alternative embodiment, the magnetic material may be a paramagnetic material or a superparamagnetic material. In some cases, use of a paramagnetic or superparamagnetic material may be accompanied by use of a stronger magnetic force during recovery.

A wide variety of dyes may be arranged so as to surround the polymer core. In one embodiment, the dye may be arranged so as to surround the polymer core by hydrophobic adsorption or hydrophobic bonding. In another embodiment, the dye may be hydrophobically bonded to the polymer core. Such dye may be transferred to a surface of a fiber upon contacting the fiber and the dyeing composite.

The dye may be selected from colored substances in accordance with the fiber types to be dyed. As described below in detail, dyes may have: a polyaromatic skeleton structure; polar groups to trigger polarization for color formation and/or functional groups that react to fibers for improving color fastness. In one embodiment, the dye may be a polyaromatic compound. The polyaromatic compound has a strong hydrophobicity and may be arranged so as to surround the polymer core by hydrophobic adsorption or hydrophobic bonding. In the present disclosure, the magnetic material may be selected from the group consisting of direct dye, acidic dye, basic dye, mordant dye, acidic mordant dye, vat dye, disperse dye, reactive dye and sulfur dye. The dyes may be used alone, or two or more dyes may be used in combination.

A direct dye is generally water-soluble and may be applied to fibers such as cotton, wool, silk and cellulosic fiber, e.g., rayon, using neutral or slightly alkaline dye baths. It may be selected from dyes having a specific plane structure, such as naphthalene azo, stilbene phthalocyanine or a heterocyclic structure, and having a sulfonic group. Examples of direct dye may include, but are not limited to, karyasu dye, Sirius dyes, Direct Red 2 ($C_{34}H_{26}N_6Na_2O_6S_2$), and Direct Red 28 (Congo Red, $C_{32}H_{22}N_6Na_2O_6S_2$).

Acidic dye is a water-soluble anionic dye and may be applied to fibers such as silk, wool and nylon using neutral to acidic dye baths. It may be selected from dyes having one to four sulfonic group(s) per molecule. Examples of acidic dye include, but are not limited to, 1:1 metal-complex acidic dyes, 1:2 metal-complex acidic dyes and Acid Orange 7 (Orange II, $C_{16}H_{11}N_2NaO_4S$).

Basic dye is a water-soluble cationic dye and may be applied to fibers such as acrylic fibers, wool and silk using weakly acidic dye baths. It may be applied to cellulosic fibers after mordanting with acidic substances such as tannic acid. A non-limiting example of the basic dye is Basic Blue 9 (Methylene Blue, $C_{16}H_{18}N_3^+Cl^-$).

Mordant dye is a dye which requires a mordant. It may be used with a mordant such as a metal hydroxide or metal oxide. A non-limiting example of the mordant dye may be Mordant Red 11 (Alizarine, $CH_{14}H_8O_4$).

Acidic mordant dye is a dye with the properties of both an acidic dye and a mordant dye, and may be applied to fibers such as wool, silk, nylon and acrylic fibers. It is also known as a chrome dye since the mordant used with the dye is mainly a chrome salt or chromate salt. A non-limiting example of the acidic mordant dye may be Mordant Black 3 ($C_{26}H_{13}N_2NaO_5S$).

Vat dye is a dye which is essentially insoluble or poorly-soluble in water. It may be reduced with a reductant to produce a compound (leuco compound) which is soluble in an alkaline aqueous solution before dyeing a fiber. It may have indigo or anthraquinone-type structures. A non-limiting example of the vat dye may be Vat Blue 1 (Indigo, $C_{16}H_{10}N_2O_2$).

Disperse dye is a dye which is essentially insoluble or poorly-soluble in water. It may be applied to fibers such as acetate fiber, nylon and polyester in a finely dispersed state using a dispersing agent (surfactant). Examples of the disperse dye may include, but are not limited to, Disperse Yellow 7 ($C_{19}H_{16}N_4O$), Disperse Orange 3 ($C_{12}H_{10}N_4O_2$), Disperse Red 17 ($C_{12}H_{20}N_4O_4$), and Disperse Violet 1 (1,4-diaminoanthraquinone, $C_{14}H_{10}N_2O_2$).

Reactive dye is a dye which is capable of directly reacting with the fiber to produce covalent bonds that link the reactive dye and the fiber. It may be applied to fibers such as cellulosic fibers, wool, silk and nylon. Examples of the disperse dye include, but are not limited to, Procion dyes, Remazol dyes, and Reactive Red 1 ($C_{19}H_9N_6Na_3O_{10}S_3Cl_2$).

Sulfur dye is a dye which is insoluble in water, obtained by melting an aromatic compound, such as aminophenol, with sodium sulfide or sulfur. The sulfur dye may be reduced in a sodium sulfide solution to produce a solution for dyeing fiber. After dyeing, the dye on the fiber may be oxidized with air or oxidants. It may be applied to fibers such as cotton, cellulosic fiber and vinylon fiber to produce dark colors. A non-limiting example of the sulfur dye may be Sulfur Black ($C_6H_4N_2O_5$).

In one embodiment, the dyeing composite further may comprise a hydrophobic layer covering the polymer core. As described above, dyes may have high hydrophobicity, and the hydrophobic layer may hydrophobically adsorb or hydrophobically bind the dye.

A wide variety of hydrophobic materials may be used as the hydrophobic layer. In one embodiment, the hydrophobic layer may be derived from a hydrophobic polymer having a small SP value. In a further embodiment, the hydrophobic polymer may be derived from a polymer having an SP value of not greater than 8, such as polyethelene with an SP value of around 7.9. In a still further embodiment, the hydrophobic layer may be derived from a hydrophobic polymer having an SP value of not greater than that of the fiber to be dyed with the dyeing composite comprising the hydrophobic layer. In the present disclosure, the hydrophobic layer may be a polymer derived from styrenes, ethylenes, acrylates, methacrylates, vinyl esters, unsaturated nitriles, glycidyl ethers, divinyl compounds, phthalates and isocyanurates, derivatives thereof and a mixture thereof. Examples of the styrenes and derivatives thereof include, but are not limited to, styrene, alpha-methylstyrene, p-methylstyrene, p-chlorostyrene, and chloromethylstyrene. A non-limiting example of the ethylenes and derivatives thereof may be polyethylene. Examples of the acrylates include, but are not limited to, methyl acrylate, ethyl acrylate, butyl acrylate, 2-ethylhexyl acrylate, stearyl acrylate, ethyleneglycol acrylate, trifluoroethyl acrylate, pentafluoropropyl acrylate, cyclohexyl acrylate, glycidyl acrylate, tetrahydrofurfuryl acrylate, 1,6-hexanediol diacrylate, neopentylglycol diacrylate, trimethylolpropane triacrylate, tetramethylolmethane triacrylate, and tetramethylolpropane tetraacrylate. Examples of the methacrylates may include, but are not limited to, methyl methacrylate, ethyl methacrylate, butyl methacrylate, 2-ethylhexyl methacrylate, stearyl methacrylate, ethyleneglycol methacrylate, trifluoroethyl methacrylate, pentafluoropropyl methacrylate, cyclohexyl methacrylate, glycidyl methacrylate, tetrahydrofurfuryl methacrylate, 1,6-hexanediol dimethacrylate, neopentylglycol dimethacrylate, trimethylolpropane trimethacrylate, tetramethylolmethane trimethacrylate, and tetramethylolpropane tetramethacrylate. Examples of the vinyl esters and derivatives thereof may include, but are not limited to, vinyl acetate, vinyl propionate and vinyl chloride. A non-limiting example of the unsaturated nitriles and derivatives thereof may be acrylonitrile. A non-limiting example of the glycidyl ethers and derivatives thereof may be glycidyl methacrylate. Examples of the divinyl compounds and derivatives thereof may include, but are not limited to, divinyl benzene, divinyl phenyl and divinyl naphthalene. A non-limiting example of the phthalates and derivatives thereof may be diallyl phthalate and its isomers. A non-limiting example of the isocyanurates and derivatives thereof may be triallyl isocyanurate. The polymers may be used alone, or two or more polymers may be used in combination. The polymers described for the hydrophobic layer may also be used for the polymers of the polymer core.

In one embodiment, the hydrophobic layer may be derived from an amphiphilic molecule, which has both a hydrophilic group and a hydrophobic group. The hydrophobic group may be arranged on the outer surface of the polymer core, thereby forming a hydrophobic layer while the hydrophilic group binds to the polymer of the polymer core. A wide variety of amphiphilic molecules may be used to form the hydrophobic layer, in accordance with the types of magnetic materials contained in the polymer core and the types of polymer used in the polymer core. For example: an alkyl silane, such as octadecyl trichlorosilane; a cyclic organosilicone hydride, such as 1,3,5,7-tetramethylcyclotetrasiloxane; a terminally-alkylated phosphonic acid, such as $CH_3[CH_2]_nPO[OH]_2$ wherein n is 7, 9 or 17 or an octadecyl phosphonic acid ($C_{18}$—$PO_3H_2$); a long chain alkyl fatty acid, such as stearic acid: and an isocyanate compound, such as diphenylmethane-4,4'-diisocyanate ($CH_2[C_6H_4]_2[NCO]_2$) or an alkyl isocyanate (e.g., $CH_3[CH_2]_n[NCO]$ wherein n is 3, 4, 7, 11, 15 or 17) may be used for forming the hydrophobic layer. Examples of the materials used to form the hydrophobic layer may also be found in Hozumi and McCarthy, Journal of The Surface Finishing Society of Japan, Vol. 60 (2009), No. 1, p. 16-20.

In one embodiment, the polymer core containing the magnetic material, or the polymer core containing the magnetic material and further covered by the hydrophobic layer, may have an average diameter of about 1 nm to 100 mm or 100 nm to 1 mm. Such diameter range may increase the efficiency of the recovering steps using magnetic force described below. Such diameter may also inhibit uneven dyeing when using a dyeing composite in a method of dyeing a fiber.

In one embodiment, the ratio between the polymer of the polymer core and the magnetic material contained in the polymer core is about 1:2 to about 1:1000 in volume. Such range of ratio may increase the efficiency of recovering steps using magnetic force described below, as well as providing durability to the dyeing composite.

In one embodiment, the percentage of the dye surrounding the polymer core based on the polymer core is about 0.1 to about 10% in volume. Such percentage range may facilitate sufficient dyeing, as well as suppress over-pollution of the waste water or effluent with unused dyes.

In one embodiment, the dyeing composite or polymer core has a magnetic force as strong as that of a typical ferrite-type permanent magnet.

The dyeing composite may have the same properties, such as water-dispersibility, as the dye(s) comprised in it, and may be used in a manner similar to ordinary dyes.

The dyeing composite may be prepared by a number of different methods. In one embodiment, the dyeing composite may be prepared by a method comprising: providing a polymer core containing a magnetic material; and arranging at least one dye so as to surround the polymer core.

In one embodiment, a polymer core containing a magnetic material may be provided by: polymerizing the polymer in the presence of magnetic material particles; incorporating ions derived from the magnetic material in the presence of porous polymer particles; hybridizing polymer particles and magnetic material particles; depositing the magnetic materials on the surface of the polymer particles; reacting magnetic materials with the polymer on the surface of the polymer particles; adsorbing or self-assembling the polymer particles in the presence of the magnetic materials; and performing a layer-by-layer deposition technique for the polymer and the magnetic materials, etc. The method of providing a polymer core containing a magnetic material may be selected according to the polymer and magnetic material which will be comprised in the dyeing composite. Examples of providing the polymer particles encapsulating a magnetic material may also be found in Z. L. Liu et al, Journal of Magnetism and Magnetic Materials 265 (2003) 98-105.

Polymer particles encapsulating a magnetic material have been developed for diverse purposes in different fields, especially in the applied medicine field, where they are to be used as magnetically retrievable affinity latex, carriers for delivering drugs, targets for thermal medicine treatment, contrast agents for MRIs, and so on, and some of them are commercially available. Therefore, the commercially available polymer particles may be used as the polymer core containing the magnetic material for the purpose of this disclosure. Examples of the polymer particles encapsulating a magnetic material may also be found in Lu et al, Angew. Chem. Int. Ed. 2007, 46, 1222-1244.

In one embodiment, providing a polymer core containing a magnetic material may be performed by polymerizing the polymer in the presence of magnetic material particles. In one embodiment, the polymerizing may be performed by dispersion polymerization of the materials for the polymer core, e.g., styrene, divinylbenzene, and allyl alcohol, in ethanol/water under the presence of a magnetic fluid of the magnetic materials. In one embodiment, the polymerizing may be performed by simultaneously forming a polymer core by polymerization and forming magnetic materials, thereby obtaining the polymer core-containing magnetic material.

In one embodiment, the polymerization initiator may be used to initiate the polymerization. Examples of the polymerization initiator may include, but are not limited to, ammonia persulfate (APS) and potassium persulfate (KPS).

In one embodiment, the polymerization may be performed by micelle polymerization using surfactant or by emulsion polymerization using an emulsifier. The surfactant or the emulsifier may be appropriately selected depending on the polymer to be polymerized.

In one embodiment, the polymerization may be performed under a temperature equal to or above 40 degrees Celsius for causing the polymerization to proceed at adequate rate. In another embodiment, the polymerization may be performed under a temperature equal to or below a temperature that causes damage to the polymer to be polymerized, depending on the type of polymer used. In an exemplary embodiment, the polymerization may be performed under a temperature equal to or below 120 degrees Celsius.

In one embodiment, providing a polymer core containing a magnetic material may be performed by incorporating ions derived from the magnetic material in the presence of porous polymer particles. The porous polymer particles may be micro or macro porous particles. In another embodiment, the incorporating may be performed by adding ions derived from the magnetic material, e.g., ferrous ions together with ferric ions if necessary, to macro-porous hard particles or microporous hydrogel particles, and then, processing with a reducing agent, thereby obtaining a polymer core containing a magnetic material. Examples of the reducing agent may include, but are not limited to, ammonium, citric acid, ascorbic acid, hydrogen peroxide, hydrazine and sodium borohydrate.

In one embodiment, providing a polymer core containing a magnetic material may be performed by hybridizing polymer particles and magnetic material particles. In another embodiment, the hybridizing may be performed by putting magnetic material particles and polymer particles through a dry hybridization process, i.e., by attaching polymer particles to the surfaces of the magnetic material particles by means of dry tumbling, and melting the polymer particles using a frictional heat on the surfaces of the magnetic material particles to form a resin layer, thereby obtaining the polymer core containing the magnetic material.

In one embodiment, arranging at least one dye so as to surround the polymer core may be performed by rotating the polymer core and the dye in a tumbler. In another embodiment, the rotating is performed by putting the polymer core in a tumbler together with the dye and rotating the tumbler to spread the dye over the polymer core surfaces. This method is also known as the dry adsorption method, wherein the dye is adsorbed on the surface of the polymer core.

In one embodiment, arranging at least one dye so as to surround the polymer core may be performed by mixing the polymer core in a solution of the dye. In another embodiment, the mixing may be performed by dispersing the dye in an appropriate solvent, adding the polymer core to the solvent, and stirring the mixture for a certain period of time. This method is also known as the wet adsorption method, wherein the dye is adsorbed on the surface of the polymer core.

In one embodiment, the method of preparing the dyeing composite may include forming a hydrophobic layer that covers the polymer core. In another embodiment, such forming may be conducted after the providing. In another embodiment, such forming may be conducted prior to the arranging.

In one embodiment, the forming may be conducted by binding an amphiphilic molecule, which has both a hydrophilic group and a hydrophobic group, to the surface of the polymer core. The hydrophobic group may be arranged on the outer surface of the polymer core, thereby forming a hydrophobic layer while the hydrophilic group binds to the polymer of the polymer core. As described above, a wide variety of amphiphilic molecules may be used in the forming, in accordance with the types of magnetic materials contained in the polymer core and the types of polymer used in the polymer core. Examples of the forming may also be found in Hozumi and McCarthy, Journal of The Surface Finishing Society of Japan, Vol. 60 (2009). No. 1, p. 16-20.

In one embodiment, the forming may be conducted by polymerization of the hydrophobic polymer in the presence of the polymer core. In another embodiment, the polymerization may be performed by dispersion polymerization of the hydrophobic polymer, as described above for the hydrophobic layer, in ethanol/water under the presence of the polymer core obtained in the providing step.

In the method of preparing the dyeing composite described above, any method known in the art may be used in any part of the process. In one embodiment, the method of preparing the dyeing composite may utilize low-cost processes such as micelle polymerization or emulsion polymerization, and the dyeing composite may be provided in a cost-effective manner.

In one embodiment, the dyeing composite may be used in a method of dyeing a fiber. The dyeing composite may be used in the same manner as that used in ordinary dyeing processes, except that the dyeing composite is used in place of a dye. When the dyeing composite is used in a method of dyeing a fiber, the following equilibrium reaction may occur on the surface of the fibers:

[Chem. 1]

The dyeing process progresses as covalent bonds may be formed due to a chemical reaction between the dye and the fiber on the right side of the equilibrium reaction mentioned above, and/or as dyes fall out from the reaction due to a diffusion of the dye into the fiber.

The fiber to be dyed may be appropriately selected as desired. In one embodiment, the fiber to be dyed may be selected according to the type of dye used. For example: polyester may be dyed with a disperse dye; cotton or other cellulosic fiber may be dyed with a direct dye; and nylon may be dyed with an acidic dye. In another embodiment, the fiber to be dyed may be selected according to the type of polymer used in the polymer core. For example, a fiber may be dyed with the dyeing composite wherein the polymer used in the polymer core has a lower SP value compared to the fiber to be dyed.

In one embodiment, the method of dyeing a fiber may include: providing a dyeing composite comprising: a polymer core containing a magnetic material; and at least one dye arranged so as to surround the polymer core; and contacting the fiber and the dyeing composite to form a dyed fiber. In a further embodiment, the dye is removed from a dyeing composite to form a dye-removed composite and the dyed fiber in the contacting step. In such embodiment, the dye removed from the dyeing composite dyes the fiber.

In one embodiment, providing a dyeing composite may be performed in accordance with the method of preparing the dyeing composite described above.

In one embodiment, contacting the fiber and the dyeing composite to form a dyed fiber may be performed in the method of dyeing fiber. In one embodiment, the contacting may be performed in a solvent. In another embodiment, upon contacting the fiber and the dyeing composite, the dye may be removed from the dyeing composite to obtain a dye-removed composite and the dyed fiber. In another embodiment, the dye may be partially or entirely removed from the dyeing composite. The dyeing composite wherein the dye is partially or entirely removed is called a dye-removed composite. In another embodiment, upon contacting the fiber and the dyeing composite, the dye removed from the dyeing composite may react with the fiber or may transfer into the fiber by means of osmosis, and the fiber may be dyed. In another embodiment, a large part of or most of the dye which is not reacted (for example, adsorbed or bound) with the fiber may remain arranged so as to surround the polymer core, and may be recovered as described in further detail below.

In one embodiment, contacting the fiber and the dyeing composite to form a dyed fiber may be performed in a solution comprising a dyeing aid. A wide variety of dyeing aids may be used in the contacting, in accordance with the fiber types to be dyed and the types of dye used. Examples of the dyeing aids may include, but are not limited to, mirabilite anhydride and acetic acid for dip dyeing, highly sulfated oil, nonionic/anionic surfactant and ethoxylated fatty amines for level dying, as well as polyvinyl acetate, water-soluble acrylic resin and water-soluble polyvinyl acetal for fixing the dye.

In one embodiment, in the method of dyeing a fiber, the dye may be removed from a dyeing composite in a solution comprising a surfactant. A wide variety of surfactants may be used in the method of dyeing a fiber, in accordance with the fiber types to be dyed and the types of dye used. Examples of the surfactant may include, but are not limited to, nonionic surfactants such as polyethylene glycol and polypropylene glycol as well as anionic surfactants such as alkylbenzene sulfonic acid.

In one embodiment, contacting the fiber and the dyeing composite to form a dyed fiber, may be performed under heat. In another embodiment, since the dye comprised in the dyeing composite is merely arranged so as to surround the polymer core, e.g. by means of adsorption or hydrophobic bonding, when contacting the fiber and the dyeing composite under heat, the dye will be easily removed from the dyeing composite and the fiber will be smoothly dyed with the removed dye. The temperature under which the contacting is performed may be selected according to the dye used and the fiber to be dyed. In one embodiment, the temperature is set so as not to damage the fiber to be dyed. In another embodiment, the temperature is set so as optimize the rate or degree of dyeing. Some dyes will rapidly dye the fiber under high temperature while other dyes do not stay long on the fiber under high temperature.

In one embodiment, the method of dyeing a fiber may further include recovering the dye-removed composite using magnetic force. In one embodiment, the contacting may be performed in a solvent, such as water, the solvent containing the dye-removed composite is moved to an effluent treatment tank equipped with magnets, and the dye-removed composite is recovered by the magnets in the tank. In another embodiment, the dye may be partially or entirely removed from the dyeing composite to produce the dye-removed composite. In one embodiment, a large part or most of the dye which is not reacted with the fiber may remain arranged so as to surround the polymer core, and may be recovered together with the dye-removed composite using a magnetic force in the recovering. Therefore, such recovering will minimize the wastewater pollution by reducing the amount of dyes discharged in wastewater. In one embodiment, the wastewater after the recovering may contain a surfactant and/or a dyeing aid, and may be processed in a manner the same as that of ordinary wastewater according to the type of the surfactant and/or dyeing aid contained. In one embodiment, the dye-removed composite recovered in the recovering may comprise the polymer core containing magnetic materials, and at least one dye is arranged so as to surround the polymer core as described above, to obtain the dyeing composite. The dyeing composite thus obtained may be reused in a method of dyeing a fiber. For the recovering step, the device shown in FIG. 2 or any commercially-available device for recovering and/or separating magnetic materials may be used.

In one embodiment, the method of dyeing a fiber further may include mixing the dyed fiber and a polymer particle containing a magnetic material to wash the dyed fiber. In another embodiment, the polymer particle containing a magnetic material may be provided in a manner described above for the polymer core containing a magnetic material. In one embodiment, the mixing may be performed repeatedly, to thoroughly wash the dyed fiber. In one embodiment, the dye not reacted with the fiber may be adsorbed to the surface of the polymer particle during the mixing. In another embodiment, the mixing may be performed in a solvent, such as water.

In one embodiment, the method of dyeing a fiber may further include mixing the dyed fiber and a polymer particle containing a magnetic material to wash the dyed fiber, and further include recovering the polymer particle using magnetic force. In another embodiment, the mixing may be performed in a solvent, such as water, the solvent containing the polymer particle containing a magnetic material may be moved to an effluent treatment tank equipped with magnets, and the polymer particle may be recovered by the magnets in the tank. In another embodiment, the dye not reacted with the fiber may be adsorbed to the surface of the polymer particle during the mixing, and recovered together with the polymer particle using a magnetic force in the recovering. Therefore, such recovering will also help minimize the wastewater pollution by reducing the amount of dyes discharged in wastewater. In another embodiment, the polymer particle containing a magnetic material recovered in the recovering may be used as the polymer core containing a magnetic material. When at least one dye is arranged so as to surround the polymer core as described above, the dyeing composite may be obtained and the dyeing composite thus obtained may be reused in a method of dyeing a fiber.

In one embodiment, the method of dyeing a fiber using the dyeing composite will reduce the amount of water used in dyeing a fiber, mainly by reducing the amount of water required to wash the dyed fiber and remove the dye not reacted with the fiber, by utilizing magnetic force, as described above. In another embodiment, the polymer core containing a magnetic material, as well as the polymer particle containing a magnetic material, may be used repeatedly. In another embodiment, the polymer core containing a magnetic material, as well as the polymer particle containing a magnetic material, may be recovered using a magnetic force, without using filters that are expensive and last only for a certain period of time. Therefore, the overall cost of the dyeing including the recovering may be less expensive. In another embodiment, the conditions for the dyeing of a fiber are not affected in any way by the presence of the dyeing composite in the method of dyeing a fiber, and any of the processes, except for the recovering using magnetic force, may be performed by utilizing existing equipment, and the initial investment may be minimized.

In one embodiment, a method of washing the dyed fiber using a polymer particle containing a magnetic material, a method of cleaning wastewater after dyeing a fiber using a polymer particle containing a magnetic material, a method of reusing the dying composite, as well as a method of minimizing the amount of wastewater from dying, may be provided. In another embodiment, a detergent comprising a polymer particle containing a magnetic material for washing the dyed fiber is also provided.

EXAMPLES

Example 1

Dyeing Polyester 1-1. Preparation of a Polymer Core Containing Magnetic Material A polymer core containing magnetic material is prepared by a process of microemulsion polymerization. Benzoyl peroxide (BPO) is dissolved in the mixture of ferrite microbeads (Soft Ferrite from DOWA Electronics Materials Co., Ltd. Japan), styrene and divinyl benzene (DVB) to form a magnetic liquid. The magnetic liquid is treated with ultrasonic waves for 30 minutes prior to polymerization. Secondly, sodium dodecyl sulfate (SDS) and cetyl alcohol (CA) are blended and dissolved in water. Sodium hydroxide is added to the mixture to adjust the pH value to the range of 9-11. While agitating this solution in a glass flask, the magnetic liquid is evenly dripped. The stirring rate is 750 rpm. After 40 minutes, a mixed water solution of KPS (potassium persulfate) and polyethylene is added. After 3 hours of polymerization, approximately 100 ml of microemulsion is obtained. The microemulsion is then washed three times using ethanol and water, with the help of a magnetic field, to obtain a polymer core containing magnetic material (particle size: ca. 50 micrometers).

1-2. Preparation of a Dyeing Composite 1 kg of the polymer core containing magnetic material obtained in Example 1-1 above and 30 g of C.I. Disperse Yellow 7 are placed into a plastic bag. After shaking the bag to mix the polymer core and the dye, the mixture is placed in a tumbler mixer (Tumbler Mixer TM-P, Seiwa Giken Co., Ltd, Japan) and tumbled for 10 to 20 minutes, to obtain a dyeing composite wherein the polymer core containing magnetic material is covered with the dye (particle size: ca. 50.5 micrometers).

1-3. Dyeing Polyester with the Dyeing Composite 33 g (0.33% o.w.f.) of the dyeing composite obtained in Example 1-2 above is dissolved in 10 L of an aqueous solution of dyeing aid/surfactant (30 g of Nicca Sunsolt from Nicca Chemical Co., Ltd., Japan). 100 g of Polyester fiber is dipped into this solution at 100 degrees Celsius. The fiber is then washed repeatedly with an aqueous solution of the polymer core containing magnetic material obtained in Example 1-1 above. The washed fiber is then dried to obtain polyester dyed with C.I. Disperse Yellow 7.

1-4. Recovering the Polymer Core Containing Magnetic Material

The effluents from the steps of dyeing and washing in Example 1-3 above are mixed in an effluent container. The effluent container is surrounded by magnets and the polymer core containing magnetic material is recovered via the magnetic attraction of the magnets. The recovered polymer core containing magnetic material is repeatedly used in the manner described in Example 1-2 above to provide a dyeing composite and/or in Example 1-3 above to wash the dyed fiber.

Example 2

Dyeing Cotton 2-1. Preparation of a Polymer Core Containing Magnetic Material Covered with a Hydrophobic Layer A polymer core containing magnetic material covered with a hydrophobic layer is prepared by the process of emulsion polymerization. 20 g of commercially-available hydrophilic polymer beads containing gamma-$F_2O_3$ and $Fe_3O_4$ as a magnetic material (Dynabeads from VERITAS Corporation, Japan) is dispersed in 100 mL of ethanol/water to bring about a dispersion. Secondly, sodium dodecyl sulfate (SDS) and cetyl alcohol (CA) are blended and dissolved in water. Sodium hydroxide is added to the mixture to adjust the pH value to the range of 9-11. While agitating this solution in a glass flask, the dispersion is evenly dripped. The stirring rate is 750 rpm. After 40 minutes, a mixed water solution of KPS (potassium persulfate) and methacrylic acid (1 vol % of the total reaction mixture) is added. To this emulsified dispersion, 10 mL of 0.3M ammonium persulfate solution is slowly added under ice bath conditions, to obtain a polymer core containing magnetic material covered with a hydrophobic layer (particle size: ca. 200 micrometers).

2-2. Preparation of a Dyeing Composite 1 kg of the polymer core containing magnetic material covered with a hydrophobic layer obtained in Example 2-1 above and 30 g of C.I. Direct Red 28 are mixed in 1.5 L of water for 30 minutes at room temperature. The mixture is then filtered and washed. After drying, a dyeing composite is obtained wherein the polymer core containing magnetic material (covered with a hydrophobic layer) is covered with the dye (particle size: ca. 200 micrometers).

2-3. Dyeing Cotton with the Dyeing Composite 33 g (0.33% o.w.f.) of the dyeing composite obtained in Example 2-2 above is dissolved in 10 L of water. 100 g of cotton fiber is dipped into this solution for 60 minutes at 98 to 100 degrees Celsius. The fiber is then washed repeatedly with an aqueous solution of the polymer core containing magnetic material covered with a hydrophobic layer obtained in Example 2-1 above. The washed fiber is then dried to obtain cotton dyed with C.I. Direct Red 28.

Example 3

Dyeing Nylon 3-1. Preparation of a Polymer Core Containing Magnetic Material A polymer core containing magnetic material is prepared by the process of microemulsion polymerization, in a manner similar to that described in Example 1-1 above. Magnetic pellets (PPS compound from Toda Magnequench Magnetic Material Co. Ltd., China) and epoxy resin are used instead of ferrite microbeads and polyethylene, respectively, to obtain a polymer core containing magnetic material (particle size: ca. 50 micrometers).

3-2. Preparation of a Dyeing Composite

A dyeing composite wherein the polymer core containing magnetic material is covered with the dye is obtained in a manner similar to that described in Example 1-2 above, using the polymer core containing magnetic material obtained in Example 3-1 above and C.I. Acid Orange 7 (particle size: ca. 50.5 micrometers).

3-3. Dyeing Nylon with the Dyeing Composite 33 g (0.33% o.w.f) of the dyeing composite obtained in Example 3-2 above and 100 g of dyeing aid (level dyeing agent, Migregal 2NE from SENKA Corporation, Japan) is dissolved in 10 L of water. 100) g of nylon fiber is dipped into this solution. The fiber is then washed repeatedly with an aqueous solution of the polymer core containing magnetic material obtained in Example 3-1 above. The washed fiber is then dried to obtain nylon dyed with C.I. Acid Orange 7.

Figure 1:
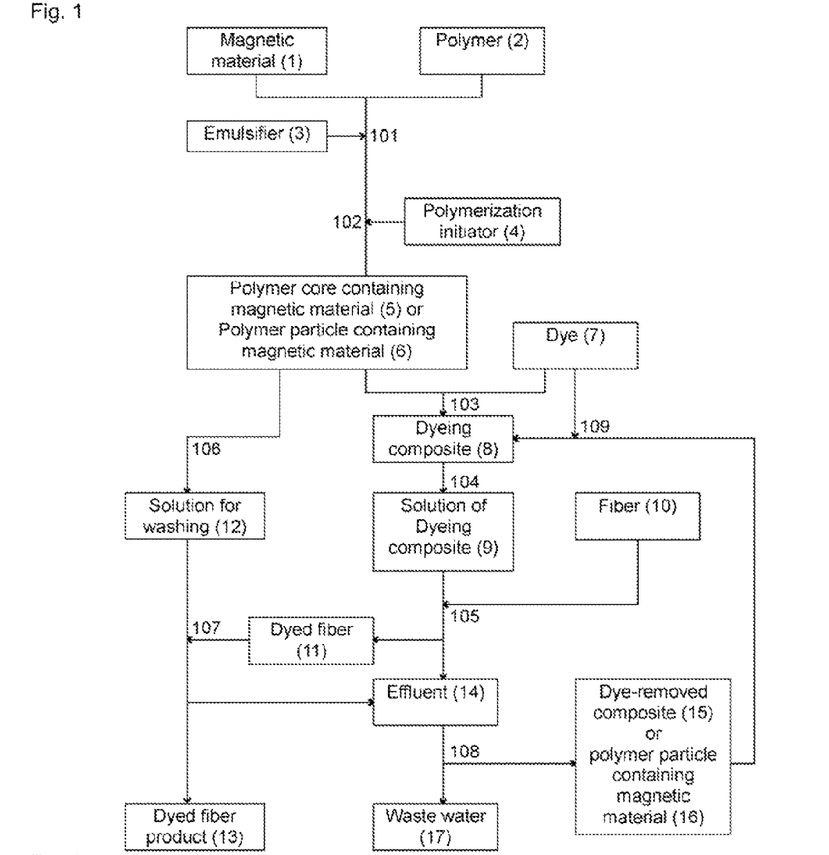
FIG. 1 shows a flow chart illustrating an example of a method of dyeing a fiber in accordance with the present disclosure.
Figure 2:
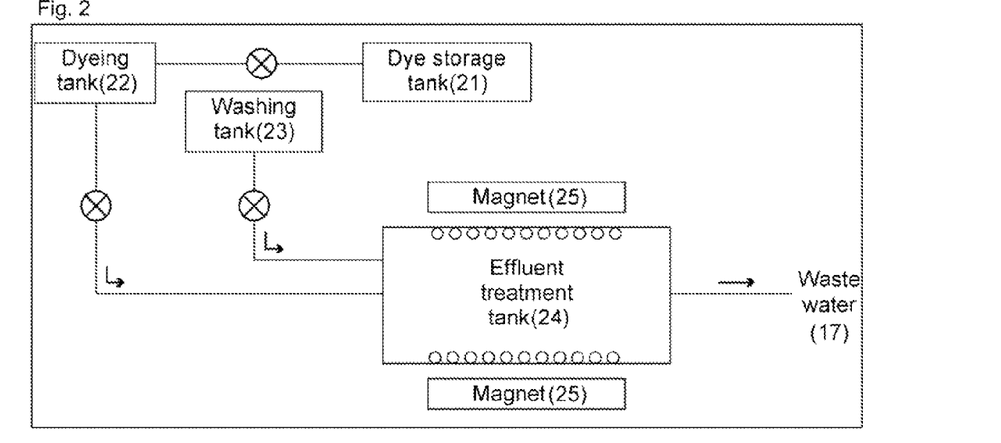
FIG. 2 shows an illustrating example of a device for dyeing a fiber in accordance with the present disclosure.

FIG. 1 shows a flow chart illustrative an example of a method of dyeing a fiber, and FIG. 2 shows an illustrative example of a device for dyeing a fiber.

Magnetic material (1) and polymer (2) are mixed or emulsified optionally in the presence of an emulsifier (3) [101]. A polymerization initiator (4) is optionally added in order to initiate the polymerization process, and polymer core containing magnetic material (5) is obtained [102]. The polymer core containing magnetic material (5) and a dye (6) are mixed in a solvent to obtain a dyeing composite (7) and the dyeing composite (7) is then stored in a dye storage tank (21) [103]. In a dyeing tank (22), the dyeing composite (7) from the dye storage tank (21) is dispersed or dissolved in a solvent to obtain a solution of the dyeing composite (8) [104]. Fiber (9) is dipped in the solution of the dyeing composite (8) and dyed so as to obtain dyed fiber (10) [105]. In a washing tank (23), polymer particle containing magnetic material (16) which is obtained in the same manner as that of the polymer core containing magnetic material (5) is dispersed in water to provide a solution for washing (11) [106]. The dyed fiber (10) is washed repeatedly in the solution for washing (11) in the washing tank (23), to obtain dyed fiber product (13) [107]. Effluent (14) from the dyeing tank (22), which comprises dye-removed composite (15), and effluent (14) from the washing tank (23), which comprises polymer particle containing magnetic material (16), are introduced into an effluent treatment tank (24) equipped with a magnet (25), the dye-removed composite (15) or the polymer particle containing magnetic material (16) is separated and recovered using a magnetic force of the magnet (25), and waste water (17) is disposed [108]. The dye-removed composite (15) or the polymer particle containing magnetic material (16) recovered may be reused to produce a dyeing composite (8) [109].

One skilled in the art will appreciate that, for this and the other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

While the present disclosure has been described with respect to a limited number of embodiments, those skilled in the art, having benefit of this disclosure, will appreciate that other embodiments can be devised which do not depart from the scope of the present disclosure as disclosed herein. Accordingly, the scope of the present disclosure should be limited only by the attached claims.

The invention claimed is:

1. A dyeing composite comprising:
a polymer core containing magnetic material; and
at least one dye arranged so as to surround the polymer core.

2. The composite of claim 1, further comprising:
a hydrophobic layer covering the polymer core.

3. The composite of claim 1, wherein the dye is a polyaromatic compound.

4. The composite of claim 1, wherein the magnetic material is selected from the group consisting of cobalt, iron, cobalt-iron alloys, cobalt alloys, iron alloys, and a mixture thereof.

5. The composite of claim 1, wherein the polymer core is derived from polymerization of monomers selected from the group consisting of acrylates, methacrylates, styrenes, vinyl chloride, vinyl chloride derivatives, polypropylene, polypropylene derivatives, polyethylene, polyethylene derivatives, engineering plastics, polyurethanes, polyamides, polyimides, epoxy resins, melamine resins, acetylcellulose, nitrocellulose, phenol resin, rubbers, and combinations thereof.

6. The composite of claim 1, wherein the dye is selected from a group consisting of direct dye, acidic dye, basic dye, mordant dye, acidic mordant dye, vat dye, dispersion dye, reactive dye, and sulfur dye.

7. The composite of claim 2, wherein the hydrophobic layer is a polymer derived from styrenes, ethylenes, acrylates, methacrylates, vinyl esters, unsaturated nitriles, glycidyl ethers, divinyl compounds, isocyanurates, or a mixture thereof.

8. The composite of claim 1, wherein the polymer core is encapsulating the magnetic material.

9. A method of preparing a dyeing composite, the method comprising:
providing a polymer core containing a magnetic material; and
arranging at least one dye so as to surround the polymer core.

10. The method of claim 9, wherein providing the polymer core further comprises
forming a hydrophobic layer that covers the polymer core prior to arranging at least one dye.

11. The method of claim 9, wherein the providing is performed by any one of the following processes:
polymerizing the polymer in the presence of a magnetic material particle;
incorporating ions derived from a magnetic material in the presence of a porous polymer particle; and
hybridizing polymer particles and magnetic material particles.

12. The method of claim 9, wherein the arranging is performed by one or more of the following process:
rotating the polymer core and the dye in a tumbler; and
mixing the polymer core in a solution of the dye.

13. The method of claim 9, wherein the dye is a polyaromatic compound.

14. The method of claim 9, wherein the magnetic material is selected from a group consisting of cobalt, iron, cobalt-iron alloys, cobalt alloys iron alloys, and a mixture thereof.

15. The method of claim 9, wherein the polymer core is derived from polymerization of monomers selected from the group consisting of acrylates, methacrylates, styrenes, vinyl chloride, vinyl chloride derivatives, polypropylene, polypropylene derivatives, polyethylene, polyethylene derivatives, engineering plastics, polyurethanes, polyamides, polyimides, epoxy resins, melamine resins, acetylcellulose, nitrocellulose, phenol resin, rubbers, and combinations thereof.

16. The method of claim 9, wherein the dye is selected from a group consisting of direct dye, acidic dye, basic dye, mordant dye, acidic mordant dye, vat dye, dispersion dye, reactive dye, and sulfur dye.

17. The method of claim 10, wherein the hydrophobic layer is a polymer derived from styrenes, ethylenes, acrylates, methacrylates, vinyl esters, unsaturated nitriles, glycidyl ethers, divinyl compounds, isocyanurates, or a mixture thereof.

18. A method of dyeing a fiber, the method comprising:
providing a fiber;
providing a dyeing composite comprising: a polymer core containing a magnetic material; and at least one dye arranged so as to surround the polymer core; and
contacting the fiber and the dyeing composite to form a dyed fiber.

19. The method of claim 18, wherein contacting the fiber and the dyeing composite comprises removal of the dye from the dyeing composite to form a dye-removed composite and the dyed fiber.

20. The method of claim 19, further comprising:
recovering the dye-removed composite using a magnetic force.

21. The method of claim 18, further comprising:
washing the dyed fiber by mixing the dyed fiber and a polymer particle containing a magnetic material.

22. The method of claim 21, further comprising:
recovering the polymer particle using magnetic force.

23. The method of claim 18, wherein the contacting is performed in a solution comprising a surfactant.

24. The method of claim 18, wherein the contacting is performed in a solution comprising a dyeing aid.

25. The method of claim 18, wherein the contacting is performed under heat.

26. The composite of claim 1, wherein the magnetic material is a cobalt alloy of nickel, chromium, vanadium, manganese, magnesium, molybdenum, lead, titanium, copper, aluminum, zirconium, chromium, platinum, tungsten, gold, beryllium, or rare earth metals.

27. The composite of claim 1, wherein the magnetic material is an iron alloy of nickel, chromium, vanadium, manganese, magnesium, molybdenum, lead, titanium, copper, aluminum, zirconium, chromium, platinum, tungsten, gold, beryllium, rare earth metals or mixture thereof.

* * * * *

UNITED STATES PATENT AND TRADEMARK OFFICE
CERTIFICATE OF CORRECTION

PATENT NO. : 8,529,640 B1
APPLICATION NO. : 13/577729
DATED : September 10, 2013
INVENTOR(S) : Noguchi It is certified that error appears in the above-identified patent and that said Letters Patent is hereby corrected as shown below:

On the Title Page, item (56), under "OTHER PUBLICATIONS", in Column 2, Line 1, delete "of of" and insert -- of --, therefor.

In the Specification:

In Column 3, Line 35, delete "formation and/or" and insert -- formation: and/or --, therefor.

In Column 3, Line 52, delete "karyasu dye," and insert -- karayasu dye, --, therefor.

In Column 12, Line 2, delete "$F_2O_3$" and insert -- $Fe_2O_3$ --, therefor.

In Column 12, Line 63, delete "100) g" and insert -- 100 g --, therefor.

In the Claims:

In Column 14, Line 42, in Claim 14, delete "cobalt alloys" and insert -- cobalt alloys, --, therefor.

Signed and Sealed this
Fifth Day of August, 2014

Michelle K. Lee
*Deputy Director of the United States Patent and Trademark Office*